United States Patent [19]

Smemo et al.

[11] Patent Number: 4,947,974
[45] Date of Patent: Aug. 14, 1990

[54] FAST FILL HYDRAULIC CLUTCH

[75] Inventors: Alfred S. Smemo, Dubuque; Donald O. Johannsen, Sherrill, both of Iowa

[73] Assignee: Deere & Company, Moline, Ill.

[21] Appl. No.: 144,847

[22] Filed: Jan. 15, 1988

[51] Int. Cl.⁵ .......................................... F16D 25/063
[52] U.S. Cl. ............................ 192/85 AA; 192/106 F; 192/113 B
[58] Field of Search ........... 192/85 AA, 85 A, 106 F, 192/104 F, 87.17, 87.18, 113 B

[56] References Cited

U.S. PATENT DOCUMENTS

| | | | |
|---|---|---|---|
| 3,378,111 | 4/1968 | Greer et al. | 192/85 AA |
| 3,872,956 | 3/1975 | Herr et al. | 192/104 F X |
| 4,186,829 | 2/1980 | Schneider et al. | 192/85 AA |
| 4,425,879 | 1/1984 | Shadday et al. | 192/85 AA X |
| 4,502,582 | 3/1985 | Lech, Jr. et al. | 192/85 AA |
| 4,664,242 | 5/1987 | Downs | 192/85 AA |
| 4,706,789 | 11/1987 | McColl et al. | 192/106 F |

Primary Examiner—Leslie A. Braun
Assistant Examiner—Nicholas Whitelaw

[57] ABSTRACT

A hydraulic clutch assembly having a hydraulic circuit that is filled with oil even when the clutch is deactivated. The piston of the clutch is provided with a sealing assembly which bifrucates the cylinder into a filled an unfilled portion. The sealing assembly is located so that the centrifugal head attributable to the hydraulic fluid does not exceed the spring force of the biasing springs of the clutch piston. The sealing assembly comprises a circular land that is machined into the piston face.

6 Claims, 1 Drawing Sheet

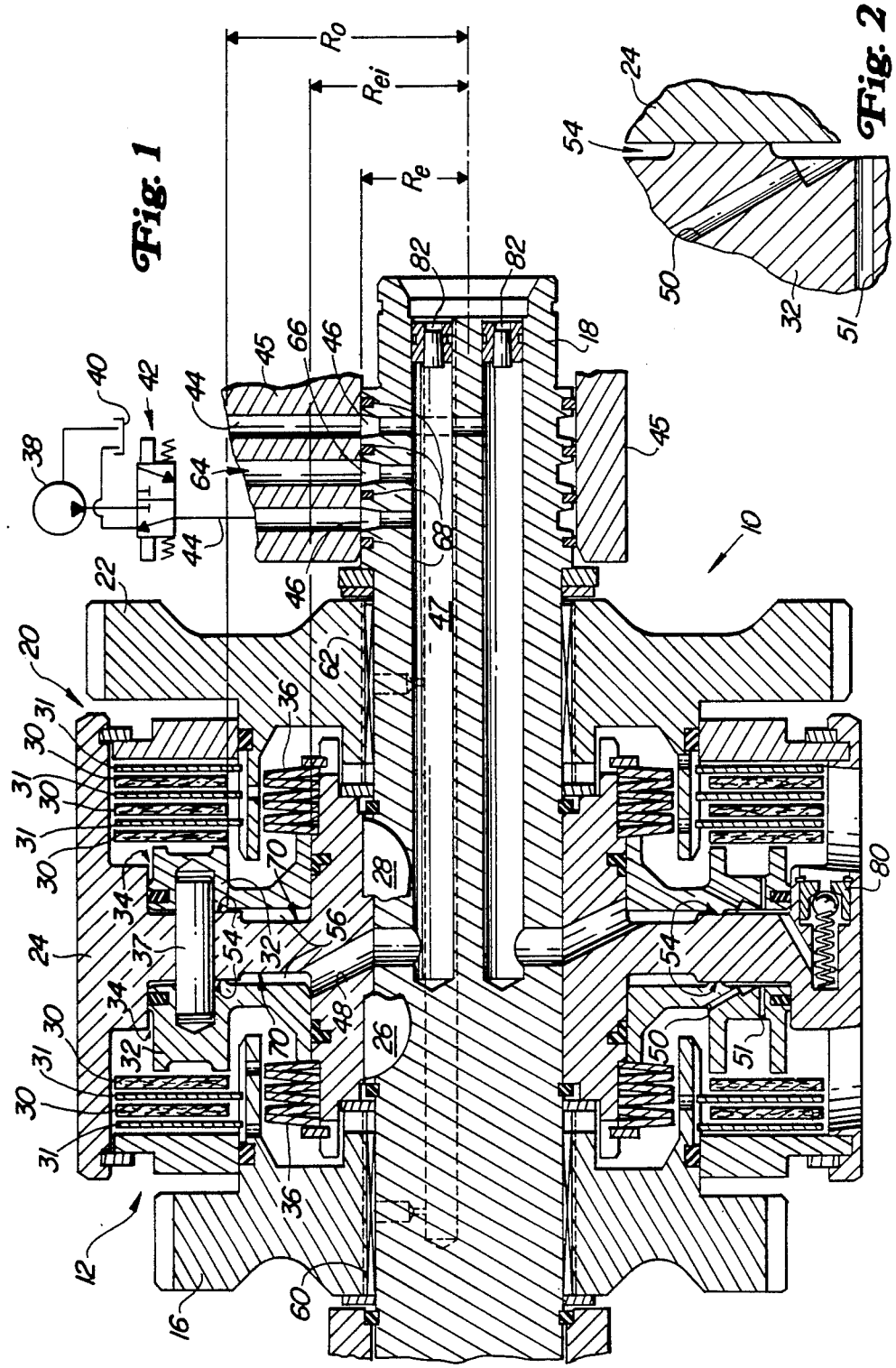

FAST FILL HYDRAULIC CLUTCH

BACKGROUND OF THE INVENTION

1. Field of the Invention

The invention is directed to a hydraulic clutch wherein the hydraulic delivery conduits and a portion of the cylinder contain hydraulic fluid after the clutch is deactivated. The invention is particularly well suited for use in a power shift transmission.

2. Description of the Prior Art

Power shift transmissions are provided with a number of hydraulic clutches which are used to engage and disengage different gear settings. Typically, these clutches comprise a plurality of friction and pressure plates that are spring biased into a disengaged position. If it is desired to engage the clutch, hydraulic fluid is applied through a conduit formed in the drive shaft to a piston which is operatively associated with the friction and pressure plates. The friction plates are then forced against the spring into the engaged position for driving a driven member. The piston is provided with small bleed apertures which allow hydraulic fluid to pass through the piston. The bleed apertures are used to reduce centrifugal head caused by the hydraulic fluid contained in the rotating cylinder.

To engage the clutch, the hydraulic delivery conduit and the entire cylinder must be recharged with fluid before the piston can be driven to engage the friction and pressure plates. This sometimes results in unstable shifting characteristics. This is especially true where the oil must be routed through very small conduits.

SUMMARY OF THE INVENTION

To overcome the limitations of prior art hydraulic clutches, it is the object of the present invention to provide a hydraulic clutch having a hydraulic circuit that is substantially filled with hydraulic fluid even when the clutch is deactivated. The object is accomplished by providing a sealing land that is formed in the piston The sealing land cooperates with the clutch drum to form a seal that bifurcates the cylinder into two portions. The portion radially in from the seal is always filled by hydraulic fluid when the clutch is deactivated. Hydraulic fluid in the outer portion is allowed to leak out of the cylinder through bleed apertures located in the piston. The hydraulic fluid delivery conduit and inner cylinder portion are continually recharged with lubricating fluid leaking across seals to the hydraulic fluid delivery conduit.

It is important that the sealing land be correctly located on the piston so as to prevent axial load caused by the rotating fluid from driving the piston and actuating the clutch. Therefore, the inner radius of the sealing land must be located so that the centrifugal head cannot overcome the springs biasing the piston to a deactivated position.

BRIEF DESCRIPTION OF THE DRAWINGS

FIG. 1 is a partial cross sectional view of a duplex clutch assembly for a powershift transmission using the present invention.

FIG. 2 is a detail cross sectional view of the sealing land.

DETAILED DESCRIPTION

FIG. 1 illustrates a duplex clutch assembly 10 for a counter shaft powershift transmission to be used on a crawler. Clutch assembly 10 comprises first clutch 12 which selectively couples driven member 16 to drive shaft 18. The clutch assembly further comprises second clutch 20 which operatively couples and decouples driven member 22 to and from drive shaft 18. Driven members 16 and 22 comprise gears which are operatively associated with other gears (not shown) for driving various output shafts of the transmission.

The clutches are mounted in clutch drum 24 which is rotatively coupled to drive shaft 18 by keys 26 and 28. The first clutch is provided with a plurality of friction and pressure plates 30 and 31, respectively, a hydraulic piston 32 located in cylinder 34, and Belleville springs 36 for biasing the piston into a disengaged position. Piston 32 slides axially along pins 37 (only one shown) which are mounted to the clutch drum. To engage the clutch, hydraulic fluid is pumped by pump 38 from sump 40 through valve 42 housing and conduit 44. Valve 42 essentially controlling the hydraulic signal directed to the clutch. Housing conduit is formed in housing 45 of the transmission. From there, the hydraulic fluid flows into circumferential groove 46 formed in the drive shaft and into conduit 47 which extends longitudinally inside the drive shaft. The fluid is then directed through conduit 48 formed in the clutch drum to cylinder 34. The pressure of the hydraulic fluid drives piston 32 against the force of the springs compressing the friction plates against the internally splined pressure plates thereby rotatingly coupling the drive shaft to driven member 16. The friction and pressure plates form a means operationally positioned between piston 32 and driven member 16 for transferring rotational motion between the piston and the driven member.

The hydraulic circuitry for charging the clutch, illustrated in FIG. 1, is a simplified example of a hydraulic clutch actuating circuit. Other more sophisticated configurations would be obvious to persons having ordinary skill in the art.

The piston is provided with bleed apertures 50 and 51. Apertures 50 allow air to bleed into the outer periphery of the cylinder, and apertures 51 allow hydraulic fluid to leak out of the cylinder to relieve axial pressure on the piston caused by the rotating hydraulic fluid. With some previous clutches, after the clutch has been disengaged, hydraulic fluid would be forced by springs 36 back through the delivery conduits to sump 40. Residual hydraulic fluid remaining in the conduit would be centrifugally forced to the cylinder where it would be drained from the cylinder. Therefore, the delivery conduits would be empty the next time the clutch would be engaged and would have to be recharged before the piston could be driven against the springs.

The present invention overcomes this problem by forming a sealing assembly between the face of the piston and the cylinder wall. More specifically, in the illustrated embodiment, the sealing assembly comprises a sealing land 54 formed in the face of the piston. The sealing land is circular with a center corresponding to the longitudinal axis of the drive shaft. The circular land forms a seal preventing the outward flow of hydraulic fluid to the bleed apertures. Sealing land 54 together with clutch drum wall 70 defines an inner hydraulic fluid containing portion 56 of the cylinder which remains filled with hydraulic fluid after the clutch is deactivated. It should be noted that the sealing assembly may also be formed by forming a sealing land in the cylinder wall.

The axial force on the piston due to the centrifugal head created by the rotating fluid must not exceed the spring force of the springs or the piston would be driven against the springs resulting in actuation of the clutch. As such, the radial distance from the longitudinal axis of the drive shaft to the inner radial edge of the sealing land must be correctly sized. The axial force of the centrifugal head on the piston may be found by writing the differential equation of the centrifugal pressure gradient, see Equation 1:

$$\frac{dP}{dr} = \rho r \omega^2 \qquad \text{Eq. 1}$$

wherein $\rho$ is oil density, r radius, $\omega$ angular velocity and P pressure. From Equation 1, a centrifugal head equation can be derived, see Equation 2:

$$Fch = \frac{\pi \rho \omega^2}{4} [Ro^4 - 2Re^2(Ro^2 - Ri^2) - Ri^4] \qquad \text{Eq. 2}$$

wherein Fch is the force due to centrifugal head, Ro is the outside radius of the clutch cylinder, Ri is the inside radius of the clutch piston, and Re is the hydraulic entry radius of the drive shaft. By simplifying, $\omega$ from radius per second to RPM and changing $\omega$ to N, replacing density $\rho$ with specific weight $\gamma$ (lb/ft$^3$), and piston radii into inches, Equation 2 is transformed into Equation 3:

$$Fch = (12.91 \times 10^{-9})\gamma N^2 \times [Ro^4 - 2Re^2(Ro^2 - Ri^2) - Ri^4] \qquad \text{Eq. 3}$$

Equations 2 and 3 disclose that centrifugal head is primarily a function of rotating speed squared and the piston outside radius to the fourth power. Rotating speed of the clutch drum is a function of transmission ratios and power flows, whereas the outside radius of the piston is a function of piston geometry. By forming the sealing land in the piston, the effective outside diameter of the piston for generating centrifugal head is reduced, thereby permitting hydraulic fluid to be stored in the conduit and a portion of the cylinder.

Some hydraulic fluid in conduit 44 and cylinder portion 56 may leak past sealing land 54 or past other sealing assemblies. As such, it is necessary to continually recharge the conduit and cylinder. Lubricating fluid is directed to bearing surface 60 and 62 through conduit 64. As with conduit 44, lubricating conduit 64 is provided with circumferential groove 66 on drive shaft 18. Seals 68 formed between the grooves are hooked iron sealing rings that do not provide a complete seal, as such, fluid leaks between seals 68. When the clutches are deactivated, the hydraulic pressure in the delivery conduits is effectively zero. The lubricating conduit, however, is pressurized to deliver lubricating fluid to the bearing surfaces Therefore, lubricating fluid leaks past the seals 68 and enters delivery conduit 44 recharging the conduit and cylinder. Therefore, delivery conduit 44 and cylinder portion 56 defined by sealing land 54 remain filled and can be more quickly activated when desired because only an extremely small portion of the cylinder is not filled with the hydraulic fluid. Therefore, in applying the clutch, essentially only the stroke volume of the cylinder needs to be filled.

Second clutch 20 operates in a manner identical to first clutch 12. It may be operated independently or in conjunction with clutch 12.

Both clutches are also provided with centrifugal relief valves 80 (only the relief valve for clutch 20 being illustrated) that are fluidically coupled to the cylinders. The sealing ball of these valves becomes unseated as it is forced radially outward by the centrifugal action of the brake drum. These relief valves are designed to vent the cylinder if before the centrifugal head would activate the piston. These valves would be used if the bleed apertures became plugged or were unable to handle the hydraulic flow necessary to relieve the centrifugal head. Drive shaft 18 is provided with plugs 82 which are used to seal the longitudinal delivery conduits.

The invention should not be limited to the above described embodiment, but should be limited solely by the claims that follow.

We claim:

1. A fluid actuated clutch, comprising:
   a drive shaft having a central longitudinal axis around which the drive shaft is rotated;
   a clutch drum mounted to the drive shaft, the clutch drum forming a hydraulic cylinder;
   a fluid delivery conduit formed in the drive shaft for directing a hydraulic signal to the cylinder;
   a piston movably positioned in the cylinder for movement between an activated position and a deactivated position in response to the hydraulic signal;
   a spring operatively associated with the piston, the spring having a biassing force driving the piston into the deactivated position;
   a driven member operatively coupled to the piston;
   means operatively positioned between the piston and the driven member for transferring rotational motion between the piston and the driven member; and
   a sealing assembly forming a seal between the hydraulic cylinder and the piston, the sealing assembly comprising a ring having a center that intersects the longitudinal axis of the drive shaft, the ring having an inner radius that defines a fluid containing portion of the cylinder when the piston is in the deactivated position, the fluid containing portion being radially inward from the inner radius of the ring, whereby rotation of the drive shaft and the fluid containing portion of the cylinder creates an axial load on the piston opposing the biassing force on the piston by the spring, the inner radius of the ring being located at a distance radially outward from the longitudinal axis so that the axial load does not exceed the biassing force of the spring, the ring stops forming the seal between the hydraulic cylinder and the piston when the piston is in the activated position.

2. A clutch as defined by claim 1 wherein the hydraulic cylinder defines an annular space that is concentrically arranged around the longitudinal axis of the drive shaft; and the piston is an annular member longitudinally slidable in the annular space.

3. A clutch as defined by claim 2 wherein the piston is provided with at least one bleed aperture for draining fluid from the second portion of the cylinder formed by the sealing assembly.

4. A clutch as defined by claim 3 further comprising a housing having a housing fluid conduit which communicates with the fluid delivery conduit of the drive shaft.

5. A clutch as defined by claim 4 further comprising a lubricating conduit for supplying lubricating fluid to the clutch, the lubricating conduit being located adjacent to the fluid delivery conduit, the lubricating conduit is allowed to leak lubricating fluid into the delivery conduit to maintain the delivery conduit in a filled condition when the clutch is in the deactivated position.

6. A clutch as defined by claim 5 wherein the ring comprises a circular sealing land formed on the piston.

* * * * *